United States Patent

Avetisian et al.

[11] Patent Number: 5,433,018
[45] Date of Patent: Jul. 18, 1995

[54] PURGE FEEDING MEANS AND METHOD

[75] Inventors: Vahan Avetisian, Burbank; Constantin Bugescu, La Habra Heights; Craig J. Castagnoli, Rowland Heights; Suk-Bae Cha, Long Beach, all of Calif.

[73] Assignee: Texaco Inc., White Plains, N.Y.

[21] Appl. No.: 142,020

[22] Filed: Oct. 28, 1993

[51] Int. Cl.$^6$ .............................................. F23K 3/00
[52] U.S. Cl. ........................................ 34/182; 110/228
[58] Field of Search ............... 34/516, 517, 179, 180, 34/181, 182, 183, 165, 166; 110/101 R, 275, 228; 414/196, 197

[56] References Cited

U.S. PATENT DOCUMENTS

| | | | |
|---|---|---|---|
| 2,351,706 | 6/1944 | Robinson | 34/181 |
| 3,766,664 | 10/1973 | Burgin | 34/182 |
| 4,235,676 | 11/1980 | Chambers | 202/118 |
| 4,474,524 | 10/1984 | Kawakami et al. | 414/213 |
| 4,499,669 | 2/1985 | Haeck | 34/102 |
| 4,652,289 | 3/1987 | Drouet et al. | 65/27 |
| 4,686,008 | 8/1987 | Gibson | 202/118 |
| 4,932,785 | 6/1990 | Bracegirdle | 366/7 |
| 5,037,628 | 8/1991 | Fader | 423/449 |
| 5,074,225 | 12/1991 | Petrie | 110/101 R |
| 5,095,040 | 3/1992 | Ledford | 521/40.5 |
| 5,129,995 | 7/1992 | Agarwal | 201/21 |

*Primary Examiner*—Henry A. Bennett
*Assistant Examiner*—William C. Doerrler
*Attorney, Agent, or Firm*—George J. Darsa; Harold J. Delhommer

[57] ABSTRACT

The present invention includes a purge chamber which includes a chamber holding the interlocking solid material. An entrance port apparatus passes the interlocking solid material into the chamber where it is purged by a purging gas. An exit port apparatus passes the solid interlocking solid material from the chamber. Located within the chamber is other apparatus which move the interlocking solid material from the chamber through the exit port apparatus and other apparatus which prevent the binding of the interlocking solid material.

6 Claims, 2 Drawing Sheets

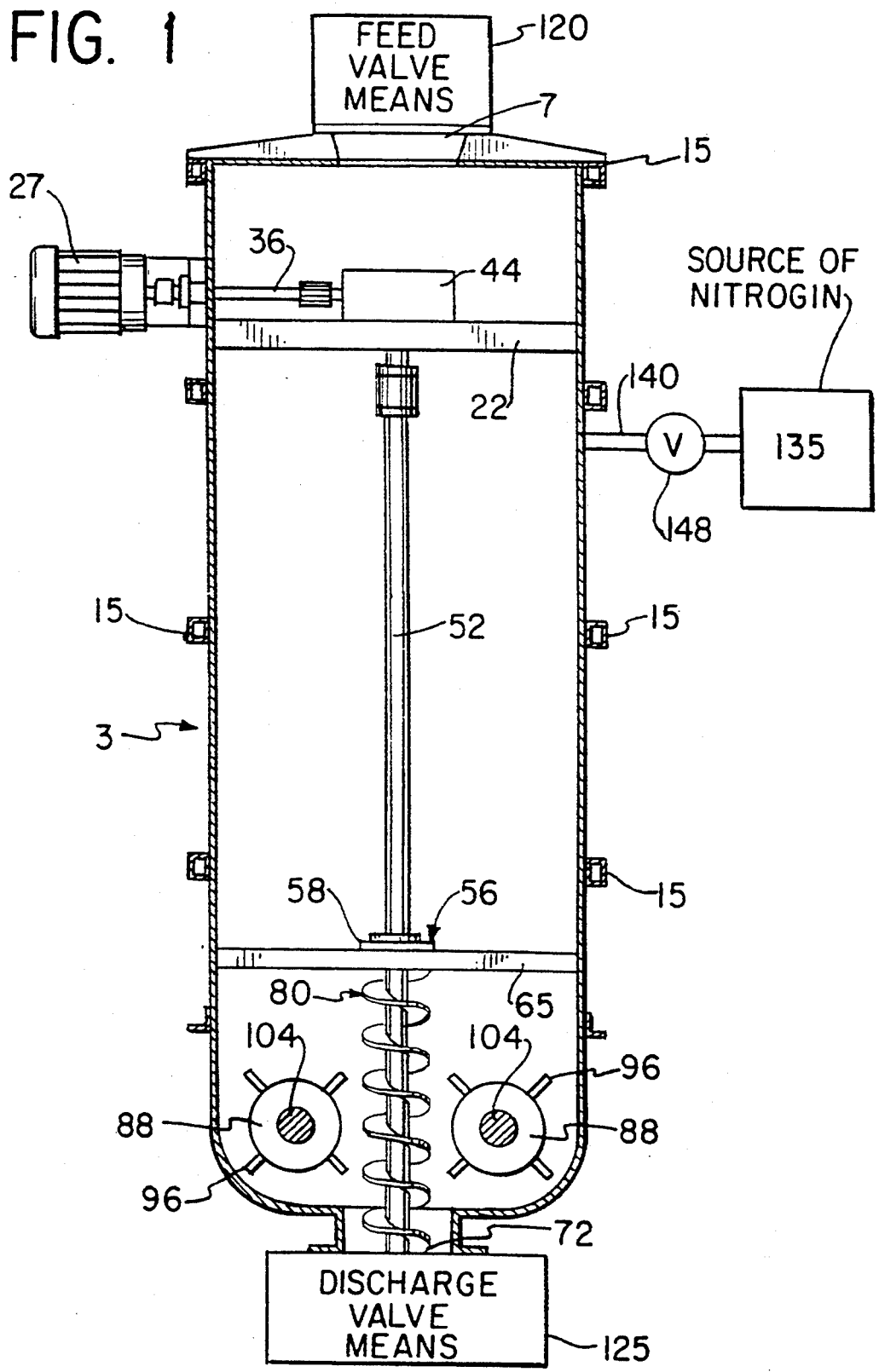

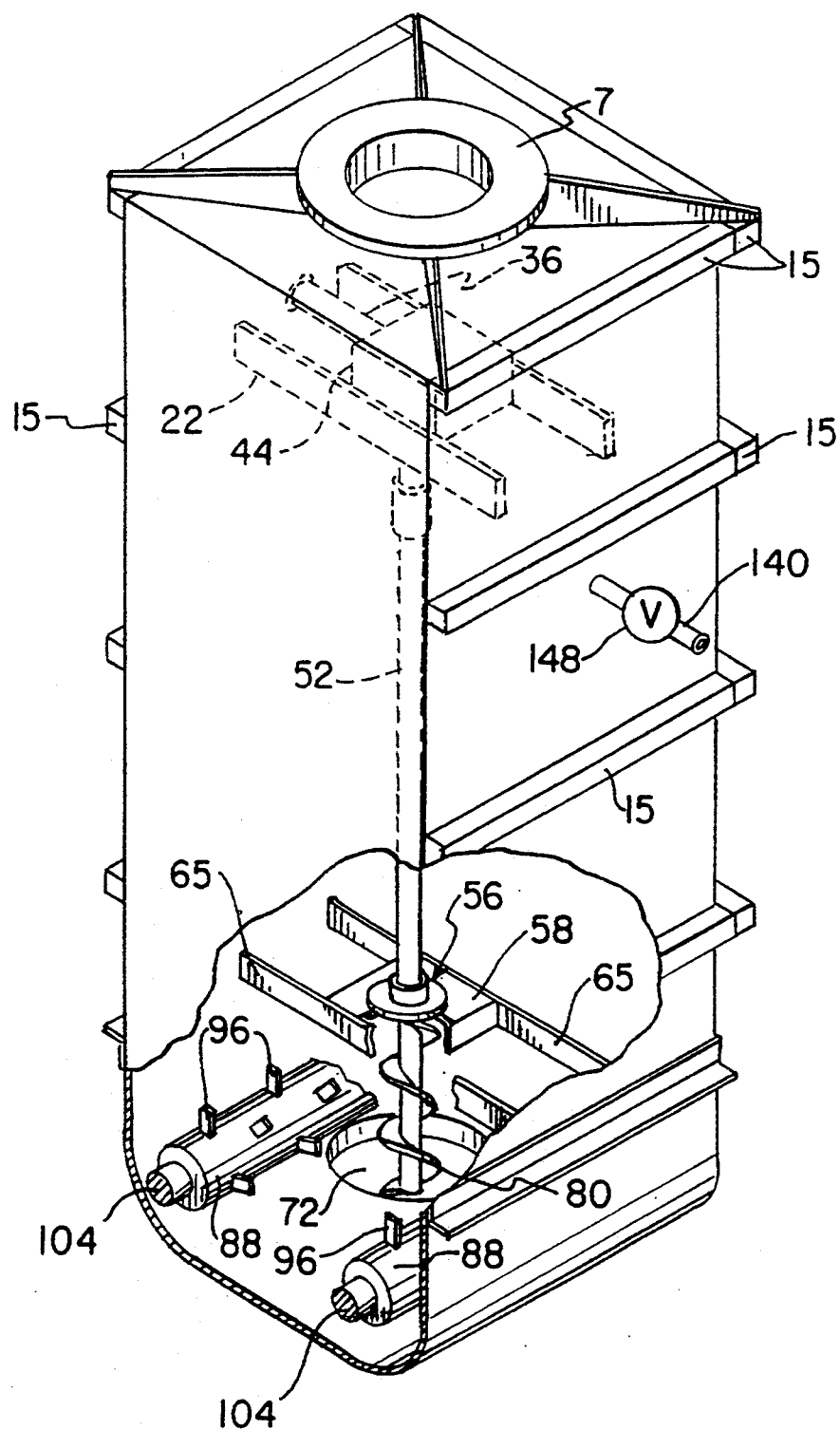

PURGE FEEDING MEANS AND METHOD

BACKGROUND OF THE INVENTION

Field of the Invention

The present invention relates to means and method for feeding interlocking solid material to process apparatus and, more particularly, to means and method for feeding shredded tires to a tire liquefaction process apparatus.

SUMMARY OF THE INVENTION

The present invention is a purge chamber which includes a chamber for holding interlocking solid material. An entrance port apparatus passes the interlocking solid material into the chamber where it is purged by a purging gas. An exit port apparatus passes the solid interlocking solid material from the chamber. Located within the chamber is moving apparatus which moved the interlocking solid material from the chamber through the exit port apparatus. Further, located within the chamber, is yet another apparatus which prevents the binding of the interlocking solid material.

The objectives and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purposes and are not to be construed as defining the limits of the invention.

DESCRIPTION OF THE DRAWINGS

FIG. 1 is a graphical representation of apparatus, constructed in accordance with the present invention, for the purge feeding of interlocking solid material to process apparatus.

FIG. 2 is a isometric view of the chamber shown in FIG. 1.

DESCRIPTION OF THE INVENTION

Referring to FIGS. 1 and 2, there is shown apparatus for the purging of interlocking solid materials in a sealed chamber. The phrase "interlocking solid material" refers to solid substances that, because of their shape and/or composition, have a strong tendency to knit together like entangled yarn. While the primary example of the present invention is related to discharging shredded tire pieces, other applications, such as woodchips, reinforced plastics and scrap may also be applicable.

In the discharging of shredded tire material to feed a tire liquefaction process, as described and disclosed in U.S. patent application, Ser. No. 08/053,727 filed Apr. 27, 1993, the shredded tire material is contacted with oil at a temperature of 700° F. It is required, therefore, that the material be purged of oxygen prior to introduction into the liquefaction reactor. The present invention is for apparatus and method for doing that.

A chamber 3 with a top feed port 7 has support members 15 to give it greater strength. Located within chamber 3 are hanger bars 22 which are used to support a material drive system including a drive motor 27. A drive shaft 36, rotated by motor 27, is connected to a gear reducer 44. Gear reducer 44 also provides a 90° F. translation of the driving force to another drive shaft 52. Associated with drive shaft 52 is a bearing 56 mounted on a mounting plate 58 having being held in place by support members 65. At the bottom of chamber 3 is an exit port 72.

Connected to drive shaft 52 is a screw auger 80 preferably turning at 20 revolutions per minute. By way of example, screw auger 80 might have an 10-inch diameter centered over a 16-inch outlet port 72. Arranged on either side of screw auger 80 are a pair of cylinders 88 having a plurality of lugs 96 mounted in a predetermined manner thereon. It should be noted that the bottom of chamber 3 is curved so as not to create any dead space between the lugs 96 on cylinder 88 and the bottom of chamber 3. Motor drive means for rotating cylinders 88 on axles 104 are not shown but their location would be obvious to one skilled in the art. The rotations of cylinders 88 may be any one of a combination of three movements with both cylinders 88 being rotated clockwise, both cylinders 88 being rotated counterclockwise or having one cylinder being rotated clockwise and the other cylinder being rotated counterclockwise. Cylinder 88 may be rotated at a rotational speed that may be from 1/10th to ½ the speed of screw auger 80.

Also shown in FIG. 1 is feed valve means 120 and discharge valve means 125. These are simply conventional style gate valves that will allow the feed to enter chamber 3 and allow the feed material to exit chamber 3. Also shown in a simplified box diagram format, is a source of nitrogen 135 which provides purging nitrogen to chamber 3 through a line 140 including a valve 148.

As shown, the system of the present invention contemplates batch feeding of a tire liquefaction processing apparatus by having the interlocking solid material, namely the shredded tires, enter through valve means 120 which is then closed. In the meantime, discharge valve means 125 being closed prevents any of the shredded tires from entering the processing apparatus.

With both valve means 120 and 125 closed, valve 148 is open to allow nitrogen to enter chamber 3 to purge the oxygen that has entered with the tires. After the oxygen level has dropped to a suitable level, valve 148 is closed, discharge valve 125 is opened, and motor 27 are energized causing the screw auger 80 to rotate driving the shredded tire material out of bin 3. However, as happens in many cases, the shredded tire will bind because of its interlocking nature. Screw auger 80 then has a tendency to tunnel through the bound material around the screw auger 80. When binding occurs, only the tire material within the range of screw auger 80 would be moved. It is at this junction that the operations of cylinders 88 by their motor drive means keep the tire material in motion so that the tire material is fed to auger screw 80, thus preventing the tunneling effect.

Upon removal of the shredded tire material from bin 3, discharge valve means 125 may be closed and the system shut down until the next batch is ready to be processed.

What is claimed is:

1. A purge chamber comprising:

chamber means for holding interlocking solid material;

entrance port means connected to the chamber means for passing the interlocking solid material into the chamber means;

purge means connected to the chamber means for providing a purging gas to the chamber means;

exit port means connected to the chamber means for passing the interlocking solid material from the chamber means;

auger screw means for moving the interlocking solid material from within the chamber means into the exit port means when rotated;

means for rotating the auger screw means;

at least two rotatable cylinders rotating around an axis substantially perpendicular to the longitudinal axis of the auger screw means, said rotatable cylinders rotated by motor means and having a plurality of lugs arranged on the cylinders for breaking up the interlocking solid material so as to prevent binding around the auger screw means.

2. A chamber as described in claim 1, in which the axis of rotation for each rotatable cylinder is substantially parallel to the axis of rotation for the other rotatable cylinder.

3. A chamber as described in claim 1 in which the auger screw means is preferably being rotated at 20 revolutions per minute.

4. A chamber as described in claim 1 in which each rotatable cylinder is rotated at a frequency of 1/10th to $\frac{1}{2}$ the rotational speed of the auger screw means.

5. A system as described in claim 1 in which each rotatable cylinders is rotated in the same rotational direction.

6. A chamber as described in claim 4 in which the rotatable means are rotated in opposite directions.

* * * * *